United States Patent
Lee et al.

(10) Patent No.: US 9,830,499 B2
(45) Date of Patent: Nov. 28, 2017

(54) METHOD OF EXECUTING FUNCTION OF ELECTRONIC DEVICE AND ELECTRONIC DEVICE USING SAME

(71) Applicant: Samsung Electronics Co., Ltd., Gyeonggi-do (KR)

(72) Inventors: Chungil Lee, Gyeonggi-do (KR); Dohyung Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/848,476

(22) Filed: Sep. 9, 2015

(65) Prior Publication Data

US 2016/0080556 A1    Mar. 17, 2016

(30) Foreign Application Priority Data

Sep. 11, 2014  (KR) .......................... 10-2014-0120155

(51) Int. Cl.

| | |
|---|---|
| *H04M 1/66* | (2006.01) |
| *G06K 9/00* | (2006.01) |
| *G06F 3/044* | (2006.01) |
| *G06F 3/0488* | (2013.01) |
| *G06F 3/0481* | (2013.01) |

(52) U.S. Cl.
CPC ......... *G06K 9/00087* (2013.01); *G06F 3/044* (2013.01); *G06F 3/0488* (2013.01); *G06F 3/04812* (2013.01); *G06K 9/00885* (2013.01); *G06F 2203/04108* (2013.01)

(58) Field of Classification Search
CPC ..... H04W 12/00; H04W 12/02; H04W 12/06; H04W 12/08; H04M 1/72519; H04M 1/677
USPC .................................................. 455/411, 566
See application file for complete search history.

(56) References Cited

U.S. PATENT DOCUMENTS

| | | | |
|---|---|---|---|
| 2010/0225443 A1* | 9/2010 | Bayram | G06F 21/316 340/5.83 |
| 2012/0233571 A1* | 9/2012 | Wever | G06F 3/048 715/835 |
| 2012/0331546 A1* | 12/2012 | Falkenburg | G06F 3/03545 726/16 |
| 2013/0111377 A1 | 5/2013 | Newman et al. | |
| 2014/0283019 A1* | 9/2014 | Sato | G06F 21/36 726/19 |
| 2015/0002461 A1* | 1/2015 | Guarneri | G06F 3/04886 345/174 |
| 2015/0146945 A1* | 5/2015 | Han | G06K 9/00033 382/125 |

* cited by examiner

*Primary Examiner* — Temica M Beamer
(74) *Attorney, Agent, or Firm* — Cha & Reiter, LLC.

(57) ABSTRACT

Disclosed is a method of performing a function of an electronic device. The method includes: detecting a first hovering object in proximity to the electronic device; measuring a first coordinate of at least one point included on a surface of the first hovering object based on detection of the first hovering object; generating first shape information on the first hovering object based on the first coordinate; and setting a function to be executed in accordance with the first shape information.

20 Claims, 8 Drawing Sheets

METHOD OF EXECUTING FUNCTION OF ELECTRONIC DEVICE AND ELECTRONIC DEVICE USING SAME

CLAIM OF PRIORITY

This application claims priority from and the benefit under 35 U.S.C. §119(a) of Korean Patent Application No. 10-2014-0120155, filed on Sep. 11, 2014, which is hereby incorporated by reference for all purposes as if fully set forth herein.

BACKGROUND

1. Field of the Invention

Described herein are method(s), generally, of generating shape information on an object by detecting, through a touch screen of an electronic device, hovering, and executing a function in accordance with the shape information, and an electronic device using the same.

2. Description of the Prior Art

Electronic devices can receive an input from the outside without any direct contact with the touch screens. Particularly, the electronic device can detect proximity of an object to the electronic device by detecting, through a touch screen, hovering by the object.

SUMMARY

As the level of sensitive information stored in a smart phone increases, the there is a need to enhance the security of smart phones, including secured access that is personal to the user (such as fingerprint recognition).

An electronic device may precisely measure heights of points included in an area of an object in proximity, and generate a three-dimensional representation of the object by using the measured heights. For example, the electronic device may individually generate three-dimensional representations of a finger (fingerprint or curved surface), and a palm (lines of the palm or curved surface), and back of the hand (skeleton or wrinkle).

According to various embodiments disclosed in this specification, the electronic device may individually generate and store three-dimensional representations of a user's body information by detecting, through a touch screen of an the electronic device, hovering. The electronic device may execute a function of the electronic device (for example, unlock or execution of an application) by using the stored shape information, thereby meeting the needs of users for security enhancement.

In accordance with certain embodiments, a method of performing a function of an electronic device, the method comprising: detecting a first hovering object in proximity to the electronic device; measuring a first coordinate of at least one point included on a surface of the first hovering object based on detection of the first hovering object; generating first shape information on the first hovering object based on the first coordinate; and setting a function to be executed in accordance with the first shape information.

In accordance with another aspect of the present disclosure, an electronic device comprising: a touch screen for detecting a first hovering predetermined object in proximity to the electronic device; a storage unit for storing shape information on the first hovering predetermined object and a setting of a function to be executed in accordance with the shape information; and a controller for measuring a first coordinate of at least one point on a surface of a first hovering predetermined object based on detection of the first hovering predetermined object, generating first shape information on the first hovering predetermined object based on the first coordinate, and setting a function to be executed in accordance with the first shape information.

In accordance with another aspect of the present disclosure, a non-transitory computer-readable medium storing a plurality of instructions, the plurality of instructions comprising commands for performing a process in an electronic device, the process comprising: detecting a first hovering object in proximity to the electronic device; measuring a first coordinate of at least one point on a surface of the first hovering object based on detection of the first hovering object; generating first shape information on the first object based on the first coordinate; and setting a function to be executed in accordance with the first shape information.

According to various embodiments disclosed in this specification, it is possible to generate shape information on an object by detecting, through a touch screen of an electronic device, hovering, and to execute a function in accordance with the shape information.

BRIEF DESCRIPTION OF THE DRAWINGS

The above features and advantages of the present disclosure will be more apparent from the following detailed description in conjunction with the accompanying drawings, in which.

DETAILED DESCRIPTION

Figure 1:
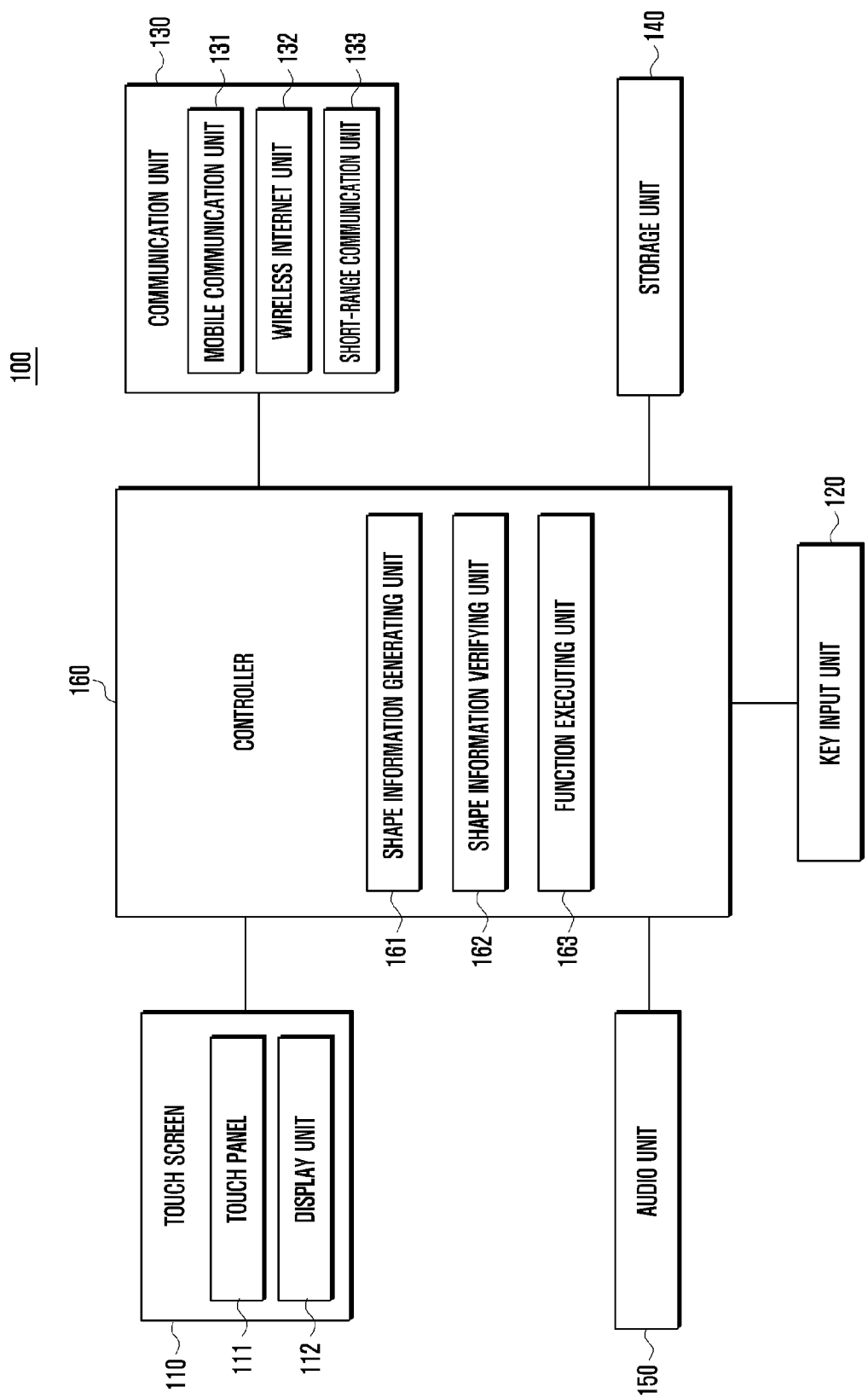
FIG. 1 is a block diagram of an electronic device according to one of various embodiments disclosed in this specification.

Hereinafter, various embodiments will be described in detail with reference to the accompanying drawings. It should be noted that the same elements will be designated by the same reference numerals although they are shown in different drawings. Further, a detailed description of a known function and configuration which may make the subject matter of the present disclosure unclear will be omitted. Hereinafter, it should be noted that only the descriptions will be provided that may help understanding the operations provided in association with the various embodiments of the present disclosure, and other descriptions will be omitted to avoid making the subject matter of the present disclosure rather unclear.

The embodiments disclosed in the present specifications and drawings are provided merely to readily describe and to give a thorough understanding of the present disclosure but are not intended to limit the scope of the present disclosure. Therefore, it should be understood that, in addition to the embodiments disclosed herein, all modifications and changes or modified and changed forms derived from the technical idea of the present disclosure fall within the scope of the present disclosure.

A "hovering state" in the present disclosure may refer to a state in which the electronic device may detect an object in proximity (for example, a body part such as a finger or an object which may generate a change in capacitance of the touch screen) and detect a height of a point of at least a part of the object. For example, a capacitive touch panel may detect a conductive object or any object having an inherited attribute different from an electrode environment of the panel. Accordingly, the human body, which is mostly composed of water, may have a high dielectric constant and contains ionic materials, and thus may be a good conductor.

According to the present disclosure, when an object is in the "hovering state", for example, when a vertical distance between the touch screen of the electronic device and the object is within a first distance (N cm), the electronic device may measure a height between the touch screen and the object. Further, the "hovering" may mean that an object approaches the touch screen to the extent that a height of a point of at least a part of the object can be detected.

According the present disclosure, "shape information" may be defined as information generated by collecting coordinates of points included in the area of the object and modeling the coordinates in three dimensions. Accordingly, as a distance between points where a change in capacitance is detected is shorter, more detailed and accurate shape information may be generated.

FIG. 1 is a block diagram of an electronic device 100 according to one of various embodiments disclosed in this specification.

The electronic device 100 may include a touch screen 110, a key input unit 120, a wireless communication unit 130, a storage unit 140, an audio unit 150, and a controller 160.

The touch screen 110 may include a touch panel 111 and a display unit 112. The touch screen 110 may display a screen related to execution of functions of the electronic device 100 and detect an input related to a control of the functions of the electronic device 100. The touch screen 110 may include a pen recognition panel for operating a pen function and the electronic device 110 may include a touch pen.

The touch panel 111 may be placed on the display unit 112. Specifically, the touch panel 111 may be implemented as an add-on type touch panel disposed on a front surface of the display unit 112, an on-cell type touch panel or an in-cell type touch panel inserted into the display unit 112. The size of the touch screen 110 may be determined by the size of the touch panel 111. The touch panel 111 can include a resistance-based touch panel, a capacitance-based touch panel, an electromagnetic induction-based touch panel, or the like.

Where the touch panel 111 includes a capacitance-based touch panel, the touch screen 110 may support an input by an object such as a finger which may generate a capacitance change. Particularly, the touch panel 111 may detect the capacitance change according to a difference in the height of the object and may measure the height of a point of at least a part of the object by using the capacitance change. When the object, which may generate the capacitance change, hovers on the touch screen 110, the touch screen 110 may receive an input for the hovering. The input for the hovering may include at least one coordinate (x, y, z). Specifically, a touch Integrated Circuit (IC) of the touch panel 111 may detect the hovering, determine a hovering area in the touch screen 110, and transfer a coordinate (x, y) included in the hovering area to the controller 160. The coordinate (x, y) included in the hovering area may be a pixel unit. In addition, the touch screen 110 may detect a height (z) corresponding to a point (x, y) of at least a part of the hovering object and transfer the coordinate (z) of the height to the controller 160. Meanwhile, a coordinate (x, y, z) of at least one point of the detected hovering object may be used for generating shape information of the object.

According to an embodiment, the electronic device 100 may model a shape of a finger's curve or a fingerprint by using the touch screen 110. In a case of the fingers, since a thumb, index finger, middle finger, ring finger, and little finger have different shapes and people have different curve levels, different lengths between knuckles, and different wrinkles between knuckles, such information may be used as personal information for security enhancement.

According to an embodiment, the electronic device 100 may model a shape of an arch of the palm or lines of the palm in three dimensions by using the touch screen 110. Since the center of the palm arches for each person has unique lines of the hand, the palm may be used as personal information for security enhancement.

According to an embodiment, the electronic device 100 may generate a three-dimensional model of a shape of a skeleton of a back of the hand or wrinkles between knuckles by using the touch screen 110. In a case of the back of the hand, features such as the size of the back of the hand, bone joint distribution, and wrinkles between knuckles may be used as personal information for security enhancement.

Under the control of the controller 160, the display unit 112 converts image data, which has been received from the controller 160, into an analog signal, and displays the converted analog signal. The display unit 112 may display a screen according to the operation of the electronic device 100, for example, a lock screen, a home screen, an application execution screen, a menu screen, a keypad screen, a message writing screen, and an Internet screen.

The display unit 112 may output a screen for receiving a c of the hovering object under control of the controller 160. For example, the display unit 112 may output an indication (for example, text or an image) instructing the user to approach a part or all of the display unit 112 with a particular body part (such as an index finger) or object. Further, when shape information on the body part or object, which the user makes approach, matches pre-stored information to the object, the display unit 112 may switch the screen to a function corresponding to the shape (for example, unlocking or executing an application) and output the switched screen. Meanwhile, the display unit 112 may output a message to instruct the user to approach the object with the particular body part or object, again when the shape information on the object is not recognized.

The key input unit 120 may include at least one of a mechanical key and a touch key. For example, the mechanical key may include at least one of a power button, which is arranged on one side of the electronic device 100 to turn on the display of the electronic device 100 when pushed, one or more volume buttons arranged on the other side of the electronic device 100 to control the volume when pushed, and a home button arranged on a lower center of the touch screen 110 of the electronic device 100 to move the screen to a home screen when pushed. For example, the touch key may include at least one of a menu arranged on one lower side of the touch screen 110 of the electronic device 100 to provide a menu related to currently displayed contents when touched and a return key arranged on the other lower side of the touch screen 110 of the electronic device 100 to provide a function of returning to a previous screen of the currently displayed screen when touched.

The communication unit 130 may form a communication channel of a preset scheme with a network (mobile communication network) which can be supported under a control of the controller 160 to transmit/receive a signal related to wireless communication such as voice communication or video communication, and message service-based data communication such as a Short Message Service (SMS), a Multimedia Messaging Service (MMS), or Internet.

The communication unit 130 of the electronic device 100 may receive shape information from an external server under a control of the controller 160. Further, the communication unit 130 may transmit shape information stored in the storage unit 140 of the electronic device 100 to the external server. Accordingly, even though the user changes the electronic device, the user may receive the shape information stored in the external service without the need to newly input the shape information every time, thereby safely and conveniently using the function of the electronic device 100.

The communication unit 130 may include at least one of a mobile communication unit 131, a wireless Internet unit 132, and a short-range communication unit 133.

The mobile communication unit 131 transmits/receives a wireless signal to/from at least one of a base station, an external terminal, and a server over a mobile communication network. The wireless signal may include data in various forms according to transmission/reception of a voice call signal, a video call signal, an SMS/multimedia message.

The wireless Internet unit 132 performs a function for an access to a wireless Internet. Use may be made of wireless Internet technologies, such as Wireless Local Area Network (WLAN) (Wi-Fi), Wireless broadband (Wibro), World Interoperability for Microwave Access (Wimax), High Speed Downlink Packet Access (HSDPA) and the like.

The short-range communication unit 133 may perform a function for short-range communication. Examples of the short-range communication technology may include Bluetooth, Radio Frequency Identification (RFID), Infrared Data Association (IrDA), Ultra Wideband (UWB), and ZigBee.

The storage unit 140 may include at least one of an internal memory and an external memory.

For example, the internal memory may include at least one of a volatile memory (for example, a Dynamic Random Access Memory (DRAM), a Synchronous Dynamic RAM (SDRAM), etc.), a non-volatile memory (for example, an One Time Programmable Read-Only Memory (OTPROM), a Programmable ROM (PROM), an Erasable and Programmable ROM (EPROM), an Electrically Erasable and Programmable ROM (EEPROM), a Mask ROM, a Flash ROM, etc.), a Hard Disk Drive (HDD), or a Solid State Drive (SSD). According to an embodiment, the controller 160 may load a command or data received from at least one of the non-volatile memory and other components in the volatile memory and process the loaded command or data. Further, the controller 160 may store the data received from or generated by other components in the non-volatile memory. For example, the external memory may include at least one of a Compact Flash (CF), a Secure Digital (SD), a Micro Secure Digital (Micro-SD), a Mini Secure Digital (Mini-SD), an extreme Digital (xD) and a memory stick.

The storage unit 140 may store an operating system for controlling resources of the electronic device 100 and an application program for an operation of an application. The operating system may include a kernel, middleware, an Application Program Interface (API), and the like. For example, the operating system may use Android, iOS, Windows, Symbian, Tizen, Bada or the like.

The storage unit 140 may store a coordinate of a point of at least a part of the detected hovering object. Coordinate information on the object may be used for generating shape information on the object by a shape information generating unit 161.

The storage unit 140 may store shape information of the detected hovering object. Meanwhile, the shape information of the object may be generated by the shape information generating unit 161 using the coordinates of the point of at least part of the object. The generated shape information may be used for verifying the object by a shape information verifying unit 162. For example, the verification of the shape information may be performed by comparing the shape information generated based on the coordinates of the object detected by the touch screen 110 with the pre-stored shape information and returning True or False according a result of the comparison.

The storage unit 140 may pre-store a setting of the function to be executed in accordance with the shape information on the object. For example, when shape information on a thumb is detected, the electronic device 100 may unlock to move to the home screen. When the shape information on an index finger is detected, the electronic device 100 may unlock to move to a call function. That is, the user of the electronic device 100 may preset the function corresponding to the shape information on the object and store the function in the storage unit 140.

The storage unit 140 may map and store the shape information on the object and a particular area of the display unit. For example, when the display unit 112 is divided into 3×3 arrangements, (x, y) where "x" represents an ordinal row number, and "y" represents an ordinal column number, the electronic device 100 may map and store the shape information on the index finger of the user and the (1, 3) area in the storage unit 140. Accordingly, the electronic device 100 may execute a preset function only when the index finger of the user is detected in the (1, 3) area. When the index finger of the user is detected in the (2, 2) area, the electronic device 100 may output an error message to the user. That is, the electronic device 100 may recognize a particular area and particular shape information, and execute a function corresponding to the recognized particular area and particular shape information.

The audio unit 150 may bi-directionally convert a voice and an electrical signal. For example, the audio unit 160 may include at least one of a speaker, a receiver, earphones, and a microphone, and convert input or output voice information.

When the user successfully inputs shape information on the object through the touch screen 110, the audio unit 150 may output a sound implying a meaning or feeling to indicate the successful input. In contrast, when the recognition of the shape information on the object fails, the audio unit 150 may output a sound implying a meaning or feeling to indicate re-attempt of the input.

The electronic device 100 may further include a camera unit (not shown). The camera unit (not shown) may photograph a still image and a moving image, and may include one or more image sensors (for example, a front lens or a rear lens), an Image Signal Processor (ISP) (not shown), and a flash LED (not shown) according to an implementation example. Meanwhile, the camera unit 150 may include at least a part of the controller 160. For example, the camera unit (not shown) may include an operation for correcting an image or calculating a feature of the image as well as an operation for obtaining the image. In this case, the camera unit (not shown) may be a functional module having a hardware module and/or memory storing a software module.

The controller 160 may control the general operation of the electronic device 100, and switch and control the operation of the electronic device 100 according to a user input made through the touch screen 110 or the key input unit 120.

The controller 160 may include the shape information generating unit 161, the shape information verifying unit 162, and a function executing unit 163.

The shape information generating unit 161 may measure a coordinate (for example, x, y, and z) of at least one point included in the area of the object by detecting, through a touch screen, hovering. The shape information generating unit 161 may generate shape information on the object by using the measured coordinate of each point.

The shape information may be defined as information generated by collecting coordinates of points included in the area of the object and modeling the coordinates in three dimensions. Accordingly, as a distance between points where the coordinates are measured is shorter, more detailed and accurate shape information may be generated.

The shape information generating unit 161 may set a particular point of the object as a reference point and acquire a coordinate difference between the reference point and another point. For example, even for the same object, the coordinate thereof may be differently measured according to how proximate the object is to the touch screen 110. Accordingly, the object shape may be modeled in three dimensions based on the setting of the reference point and the coordinate difference between the reference point and the another point.

According to an embodiment, the shape information generating unit 161 may generate a three-dimensional model of a shape of a finger's curve or a fingerprint by using the touch screen 110. In a case of the fingers, since a thumb, index finger, middle finger, ring finger, and little finger have different shapes and people have different curve levels, different lengths between knuckles, and different wrinkles between knuckles, such information may be used as personal information for security enhancement.

According to an embodiment, the shape information generating unit 161 may generate a three-dimensional model of a shape of an arch of the palm or lines of the palm by using the touch screen 110. Since the center of the palm arches and each person has unique lines of the hand, the palm may be used as personal information for security enhancement.

According to an embodiment, the shape information generating unit 161 may generate a three-dimensional model of a shape of a skeleton of a back of the hand or wrinkles between knuckles by using the touch screen 110. In a case of the back of the hand, features such as the size of the back of the hand, bone joint distribution, and wrinkles between knuckles may be used as personal information for security enhancement.

The shape information generating unit 161 may store the generated shape information in the storage unit 140. For example, predetermined shape information stored in the storage unit 140 may be used for verifying shape information by the shape information verifying unit 162.

The shape information generating unit 161 may map and store, in the storage unit 140, the shape information on the object and a location on which the shape information is input.

According to an embodiment, when the index finger of the user makes an input in the (1, 3) area of the touch screen 110 having the 3×3 arrangements, the electronic device 100 may map and store the shape of the index finger and the (1, 3) area in the storage unit 140. Accordingly, the electronic device 100 may execute a preset function only when the index finger of the user is detected in the (1, 3) area. When the index finger of the user is detected in the (2, 2) area, the electronic device 100 may output an error message to the user. That is, the electronic device 100 may recognize a particular area and particular shape information, and execute a function corresponding to the recognized particular area and particular shape information.

The shape information verifying unit 162 may compare the shape information generated by the shape information generating unit 161 with shape information newly input through the touch screen 110 by the user and determine whether the pieces of information match each other.

The shape information verifying unit 162 may receive shape information of the object through the touch screen 110 to execute the function of the electronic device 100. When a predetermined object is in a hovering state, the shape information generating unit 161 may acquire a coordinate of at least one point included in the object by using the touch screen 110 and generate shape information of the object by using the corresponding coordinate or a coordinate difference. The shape information verifying unit 162 may compare the pre-stored shape information of the object and shape information of the object in the hovering state to execute a particular function and determine whether the pieces of information match each other.

The shape information verifying unit 162 may freely rotate the generated three-dimensional model shape information and determine similarity. Accordingly, it is possible to determine whether the pieces of shape information match each other regardless of an angle at which the object approaches. Further, the shape information verifying unit 162 may freely move the three-dimensionally modeled shape information and determine similarity. Accordingly, it is possible to determine whether the pieces of shape information match each other regardless of a location at which the object approaches.

The shape information verifying unit 162 may identify and verify the shape information and an area in which the shape information is input.

According to an embodiment, when the shape information on the index finger of the user is mapped to the (1, 3) area and the mapping information is stored, the shape information verifying unit 162 may transfer a signal for executing a function corresponding to pre-stored shape information to the function executing unit 163 only when the index finger of the user is detected in the (1, 3) area. When the index finger of the user is detected in the (2, 2) area, the shape information verifying unit 162 may output an error message to the user. That is, the shape information verifying unit 162 may cause the controller 160 to detect a particular area and particular shape information and to execute a function corresponding to the recognized particular area and particular shape information.

When it is determined that newly input shape information matches pre-stored shape information, the shape information verifying unit 162 may transfer a signal for executing a function corresponding to the pre-stored shape information to the function executing unit 163.

When it is determined that the newly input shape information does not match the pre-stored shape information, the shape information verifying unit 162 may make a control to output at least one of a message, a sound, and a vibration which indicates the failure of the shape information verification. For example, when the shape information verification fails, the shape information verifying unit 162 may make a control to output a voice notification such as "shape information verification failed so please make input again".

When the newly input shape information matches the pre-stored shape information based on a result of the determination by the shape information verifying unit 162, the function executing unit 163 may execute a function corresponding to the pre-stored shape information.

According to an embodiment, when the shape information verifying unit 162 verifies shape information on the thumb, the function executing unit 163 may execute a stored unlock function corresponding to the thumb.

According to an embodiment, when the shape information verifying unit 162 verifies shape information on the index finger, the function executing unit 163 may execute a stored call function corresponding to the index finger.

That is, when the shape information verifying unit 162 verifies the shape information, the function executing unit 163 may execute a preset function in accordance with the verified shape information.

An electronic device according to various embodiments may include: a touch screen for detecting a hovering object in proximity to the electronic device; a storage unit for storing shape information on the object and a setting of a function to be executed in accordance with the shape information; and a controller for measuring a first coordinate of at least one location included in the surface of a first object based on the hovering, generating first shape information on the first object based on the first coordinate, and setting a function to be executed in accordance with the first shape information.

The controller may measure a second coordinate of at least one location included in the surface of a second hovering object and generate second shape information on the second object based on the second coordinate.

The controller may determine whether the first shape information and the second shape information match each other and, when the first shape information and the second shape information match each other, perform the set function in accordance with the first shape information.

The controller may measure the first coordinate through a first area of the electronic device and the second coordinate through a second area of the electronic device, and set the function to be executed in accordance with the first area and the first shape information.

The controller may determine whether the first area and the second area match each other and determine whether the first shape information and the second shape information match each other.

When the first area and the second area match each other and the first shape information and the second shape information match each other, the controller may perform the set function in accordance with the first area and the first shape information.

The set function may correspond to an unlock function.

When the first shape information and the second shape information do not match each other, the controller may make a control to output at least one of a message, a sound, and a vibration.

The touch screen may be a capacitive type touch screen.

Figure 2:
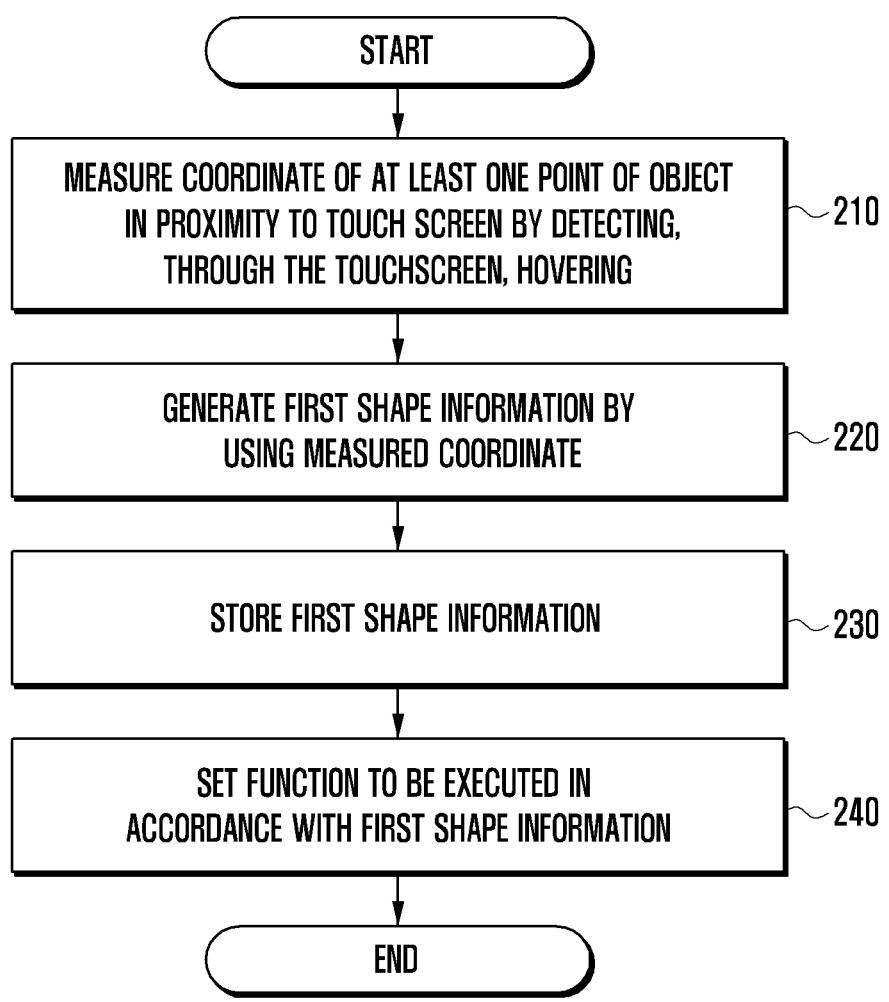
FIG. 2 is a flowchart illustrating a process for acquiring shape information on an object by using a touch screen of the electronic device according to one of various embodiments disclosed in this specification.

FIG. 2 is a flowchart illustrating a process for acquiring shape information of an object by using the touch screen of the electronic device according to one of various embodiments disclosed in this specification.

The electronic device 100 may measure a coordinate (x, y, z) of at least one point of the object in proximity to the touch screen 110 by detecting, through the touch screen, hovering 110 in a step 210.

The electronic device 100 may minutely measure the coordinate (x, y, z) of at least one point of the area included in the object by using the touch screen 110. Further, the electronic device 100 may set a predetermined point of the points included in the area of the object as a reference point. The electronic device 100 may acquire coordinate differences between the reference point and the remaining points by using the reference point. For example, even for the same object, the coordinate thereof may be differently measured according to how proximate the object is to the touch screen 110. Accordingly, when a three-dimensional model of the object is generated by using the coordinate of the reference point and the coordinate difference with the reference point, even though proximity levels of the object are different, the objects may be identified as the same object.

The electronic device 100 may generate first shape information based on the coordinate measured in step 210 (for example, the coordinate of each point or coordinate difference) in step 220.

The shape information may be defined as information generated by collecting coordinates of points included in the area of the object and modeling the coordinates in three dimensions. Accordingly, as a distance between points where the heights are measured is shorter, more detailed and accurate shape information may be generated.

According to an embodiment, the electronic device 100 may model a shape of a finger's curve or a fingerprint by using the touch screen 110. In a case of the fingers, since a thumb, index finger, middle finger, ring finger, and little finger have different shapes and people have different curve levels, different lengths between knuckles, and different wrinkles between knuckles, such information may be used as personal information for security enhancement.

According to an embodiment, the electronic device 100 may model a shape such as an arch of the palm or lines of the palm in three dimensions by using the touch screen 110. Since the center of the palm arches and each person has unique lines of the hand, the palm may be used as personal information for security enhancement.

According to an embodiment, the electronic device 100 may three-dimensionally model a shape of skeleton of back of the hand or wrinkle between knuckles by using the touch screen 110. In a case of back of the hand, features such as the size of back of the hand, bone joint distribution, and wrinkles between knuckles may be used as personal information for security enhancement.

The electronic device 100 may store the first shape information generated in step 220 in the storage unit 140 in step 230. The electronic device 100 may use the first shape information stored in the storage unit 140 for determining similarity with an object in proximity later.

The electronic device 100 may set a function to be executed in accordance with the first shape information in step 240. The electronic device 100 may preset the function to be executed in accordance with the first shape information, and, when newly input shape information on the object is the first shape information, execute the preset function.

According to an embodiment, when shape information on a thumb is detected, the electronic device 100 may unlock to move to the home screen. When the shape information on an index finger is detected, the electronic device 100 may unlock to move to a call function.

Figure 3:
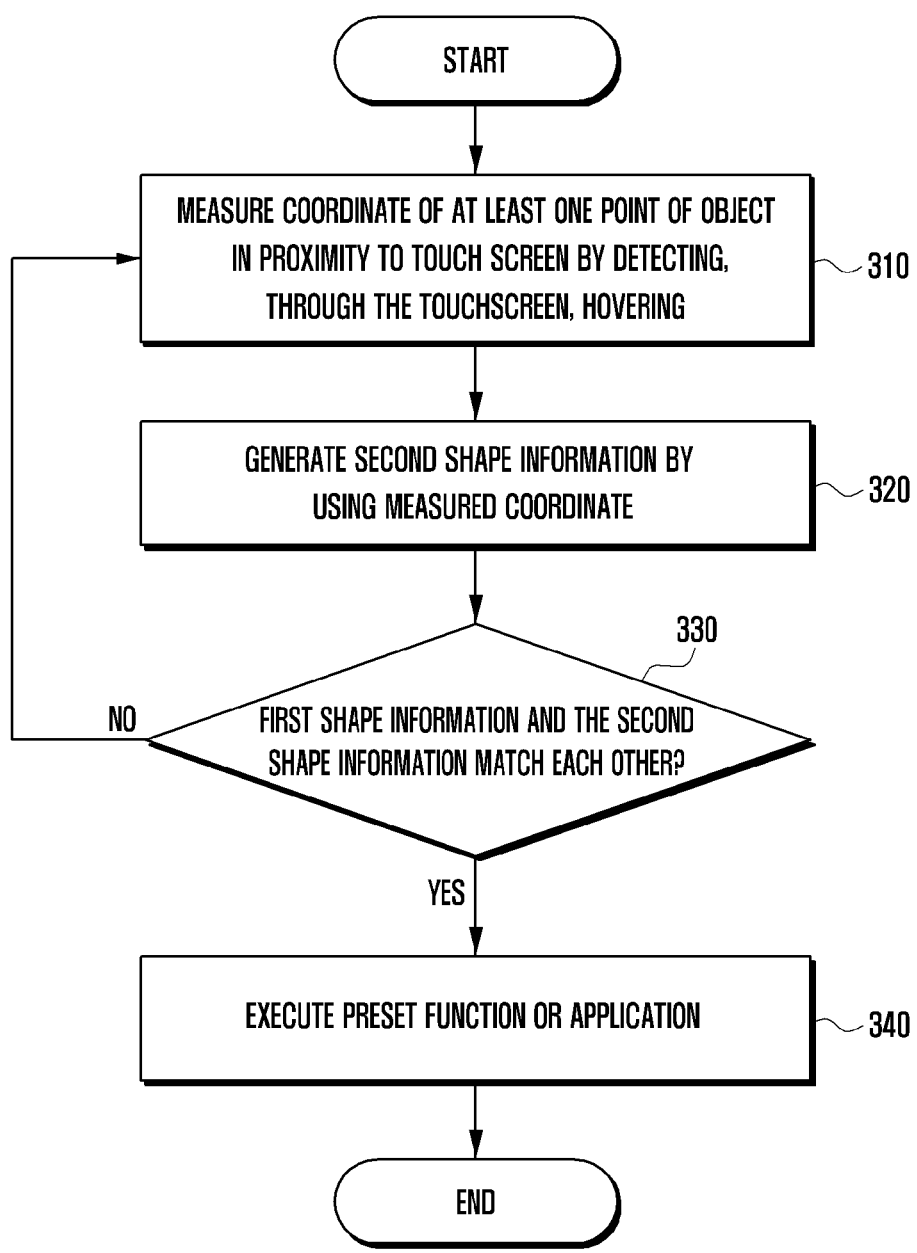
FIG. 3 is a flowchart illustrating a process for determining whether pieces of shape information match each other by using the touch screen of the electronic device and, when the pieces of information match each other, executing a preset function according to one of various embodiments disclosed in this specification.

FIG. 3 is a flowchart illustrating a process for determining whether pieces of shape information match each other by using the touch screen of the electronic device and, when the pieces of information match each other, executing a preset function according to one of various embodiments disclosed in this specification.

The electronic device 100 may measure a coordinate (x, y, z) of at least one point of the object in proximity to the touch screen 110 by detecting, through the touch screen 110, hovering, in an operation 310.

The electronic device 100 may minutely measure the coordinate (x, y, z) of at least one point of the area included in the object by using the touch screen 110. Further, the electronic device 100 may set a predetermined point of the points included in the area of the object as a reference point. The electronic device 100 may acquire coordinate differences between the reference point and the remaining points by using the reference point. For example, even for the same object, the coordinate thereof may be differently measured according to how proximate the object is to the touch screen 110. Accordingly, when modeled three-dimensional model of the object is generated by using the coordinate of the reference point and the coordinate difference with the reference point, even though proximity levels of the object are different, the objects may be identified as the same object.

The electronic device 100 may generate second shape information based on the coordinate measured in step 310 (for example, the coordinate of each point or coordinate difference) in step 320.

The shape information may be defined as information generated by collecting coordinates of points included in the area of the object and modeling the coordinates in three dimensions. Accordingly, as a distance between points where the coordinates are measured is shorter, more detailed and accurate shape information may be generated.

According to an embodiment, the electronic device 100 may model a shape of a finger's curve or a fingerprint by using the touch screen 110. In a case of the fingers, since a thumb, index finger, middle finger, ring finger, and little finger have different shapes and people have different curve levels, different lengths between knuckles, and different wrinkles between knuckles, such information may be used as personal information for security enhancement.

According to an embodiment, the electronic device 100 may model a shape such as an arch of the palm or lines of the palm in three dimensions by using the touch screen 110. Since the center of the palm arches and each person has unique lines of the hand, the palm may be used as personal information for security enhancement.

According to an embodiment, the electronic device 100 may generate a three-dimensional model of a shape of a skeleton of a back of the hand or wrinkles between knuckles by using the touch screen 110. In a case of the back of the hand, features such as the size of the back of the hand, bone joint distribution, and wrinkles between knuckles may be used as personal information for security enhancement.

The electronic device 100 may compare the second shape information generated in step 320 with the first shape information pre-stored in the storage unit 140 and determine whether the first shape information and the second shape information match each other in step 330.

The electronic device 100 may compare the first shape information stored in the storage unit 140 with the second shape information and determine similarity. The electronic device 100 may freely rotate or move the generated three-dimensional models of shape information to determine similarity therebetween. Accordingly, it is possible to determine whether the pieces of shape information match each other regardless of an angle at or a location on which the object approaches.

When it is determined that the first shape information and the second shape information match each other, the electronic device 100 may execute the function corresponding to the first shape information preset in step 240 in step 340.

According to an embodiment, when shape information on a thumb is detected, the electronic device 100 may execute an unlock function corresponding to the thumb. When the shape information on an index finger is detected, the electronic device 100 may execute a call function corresponding to the index finger.

When it is determined that the first shape information and the second shape information do not match each other, the electronic device 100 may measure the coordinate of the object in proximity to the touch screen 110 again in step 310.

According to an embodiment, the electronic device 100 may generate at least one of a message, a sound, and a vibration having a meaning to make the object be in proximity to the touch screen again since the pieces of shape information do not match each other.

Figure 4:
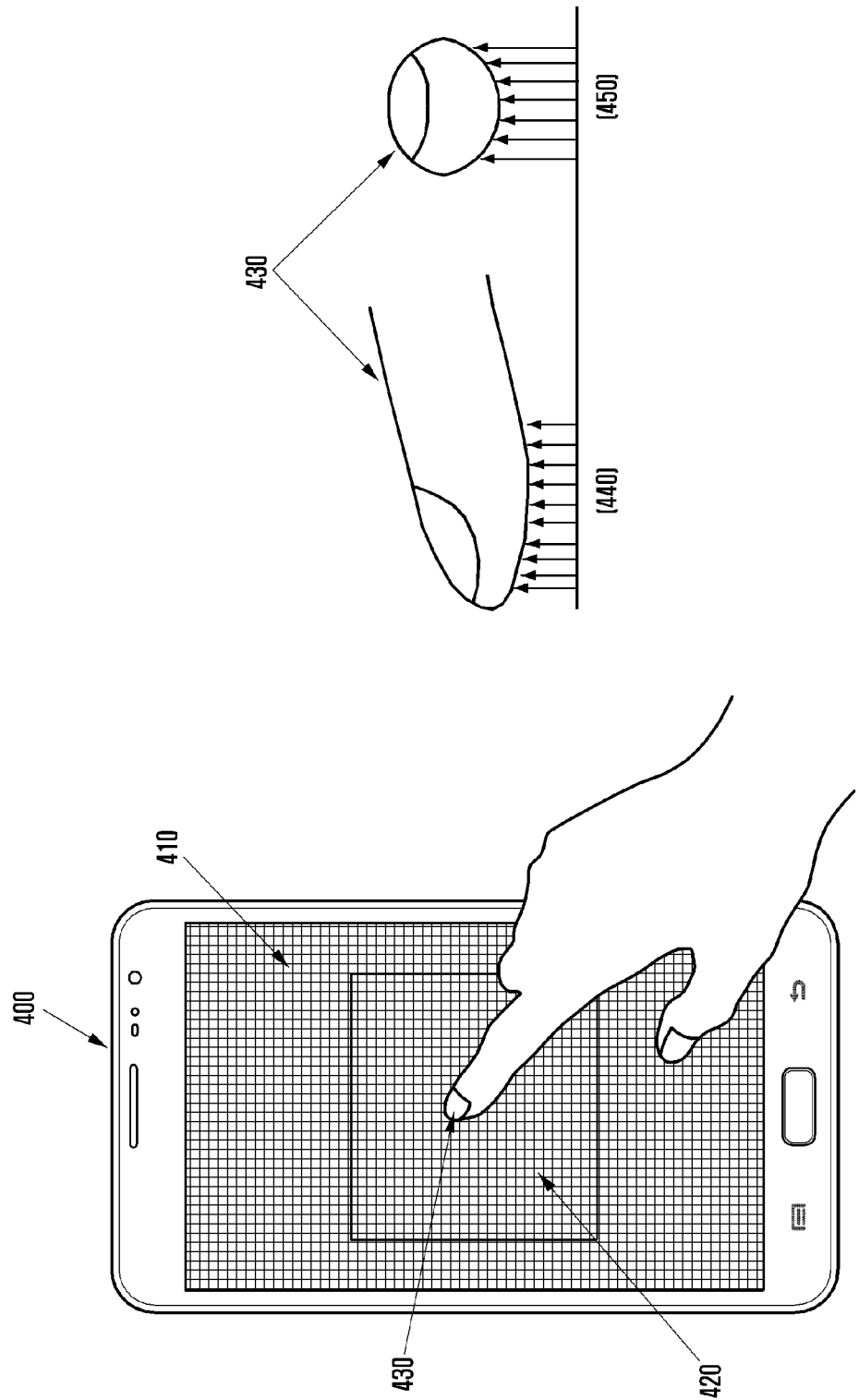
FIG. 4 illustrates a method of measuring a height of a finger by using the touch screen of the electronic device according to one of various embodiments disclosed in this specification.

FIG. 4 illustrates a method of measuring a height of a finger by using the touch screen of the electronic device according to one of various embodiments disclosed in this specification.

The electronic device 400 or 100 may generate shape information on an object in proximity to the touch screen 410 or 110. The touch screen 410 of the electronic device 400 may include the touch panel 111 and the display unit 112.

According to the present disclosure, when the touch panel 111 is configured in the capacitive type, the touch screen 410 may support an input by an object such as a finger which may generate a capacitance change. Particularly, the touch panel 111 may detect the capacitance change according to a difference in the height of the object and may measure the height of a point of at least a part of the object by using the capacitance change. When the object, which may generate the capacitance change, hovers on the touch screen 410, the touch screen 110 may receive an input corresponding to hovering. The input corresponding to hovering may include at least one coordinate (x, y, z). Specifically, a touch Integrated Circuit (IC) of the touch panel 111 may detect the hovering object, determine a hovering area in the touch screen 410, and transfer a coordinate (x, y) included in the hovering area to the controller 160. The coordinate (x, y) included in the hovering area may be a pixel unit. In addition, the touch screen 410 may detect a height (z) corresponding to a point (x, y) of at least a part of the hovering object and transfer the coordinate (z) of the height to the controller 160. Meanwhile, a coordinate (x, y, z) of at least one point of the detected hovering object may be used for generating shape information on the object.

According to an embodiment, the electronic device 400 may detect an input of a predetermined hovering object through the touch screen 410. The electronic device 400 may acquire horizontal (x) and vertical (y) coordinates of at least one point included in the object through the input. As intervals between horizontal and vertical coordinates are set more densely, the electronic device 400 may more precisely measure a height (z) of at least one point included in the area of the object. Through the above, the electronic device 400 may more finely generate the shape information on the object.

According to an embodiment, the electronic device 400 may measure a coordinate of each point included in the area of the object by activating only one area 420 of the touch screen 410. Accordingly, even though a predetermined object approaches the remaining areas other than the activated area 420, an input for hovering is not detected and thus the coordinate of at least one point included in the object may not be measured.

The electronic device 400 may generate shape information on the object by using the measured coordinate through the touch screen 410. The shape information may be defined as information generated by collecting coordinates of points included in the area of the object and modeling the coordinates in three dimensions. Accordingly, as a distance between points (x, y) in which the heights (z) are measured becomes shorter, more detailed and precise shape information may be generated.

According to an embodiment, the electronic device 400 may measure a coordinate z, of the index finger for each pixel (x, y) in area 420 of the touch screen 410. In another embodiment, the electronic device 400 may measure a height (z) in a first direction 450 (for example, x direction) of the index finger 430 and a height (z) in a second direction 440 (for example, y direction) of the index finger 430. Accordingly, the electronic device 400 may generate shape information on the index finger 430 by using the measured coordinate (x, y, z) of each point.

Figure 5:
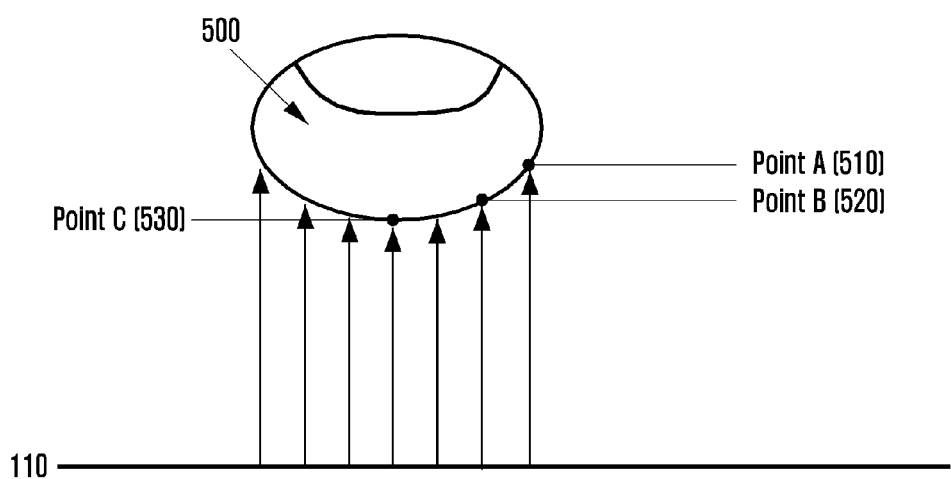
FIG. 5 illustrates a method of setting a reference point of a finger by using the touch screen of the electronic device and measuring a coordinate difference between a reference point and another point according to one of various embodiments disclosed in this specification.

FIG. 5 illustrates setting a reference point of a finger by using the touch screen 110 of the electronic device and measuring a coordinate difference between the reference point and another point according to one of various embodiments disclosed in this specification.

The electronic device 100 may measure a height of a finger 500 in proximity to the touch screen 110. When the finger 500 approaches the touch screen 110 within a predetermined distance, the finger 500 enters a hovering state and the electronic device 100 may measure a height of at least one point included in the finger from the touch screen 110 in the hovering state. Meanwhile, the height (z) of each point may be differently measured according to how proximate the finger 500 is to the touch screen. Further, x and y coordinates of each point may be differently measured according to a location on which the hovering is input. Accordingly, in order to uniformly generate the shape information on the finger 500, a correction process may be required.

The electronic device 100 may measure a coordinate of the reference point among the points included in the finger 500 and a coordinate difference between the reference point and at least one point of the remaining points by using the touch screen 110. For example, the electronic device 100 may set a point C 530 of the finger 500, which is closest to the touch screen 110, as the reference point. The electronic device 100 may three-dimensionally model the finger 500 by using a coordinate difference between the coordinate of the reference point (for example, point C 530) and another point (for example, point A 510 or point B 520). Accordingly, even though levels to which the finger 500 is proximate to the touch screen are different, the same shape information may be generated in three dimensions. Meanwhile, the electronic device 100 may set the edge of the object (point A 510) as the reference point.

Figure 6:
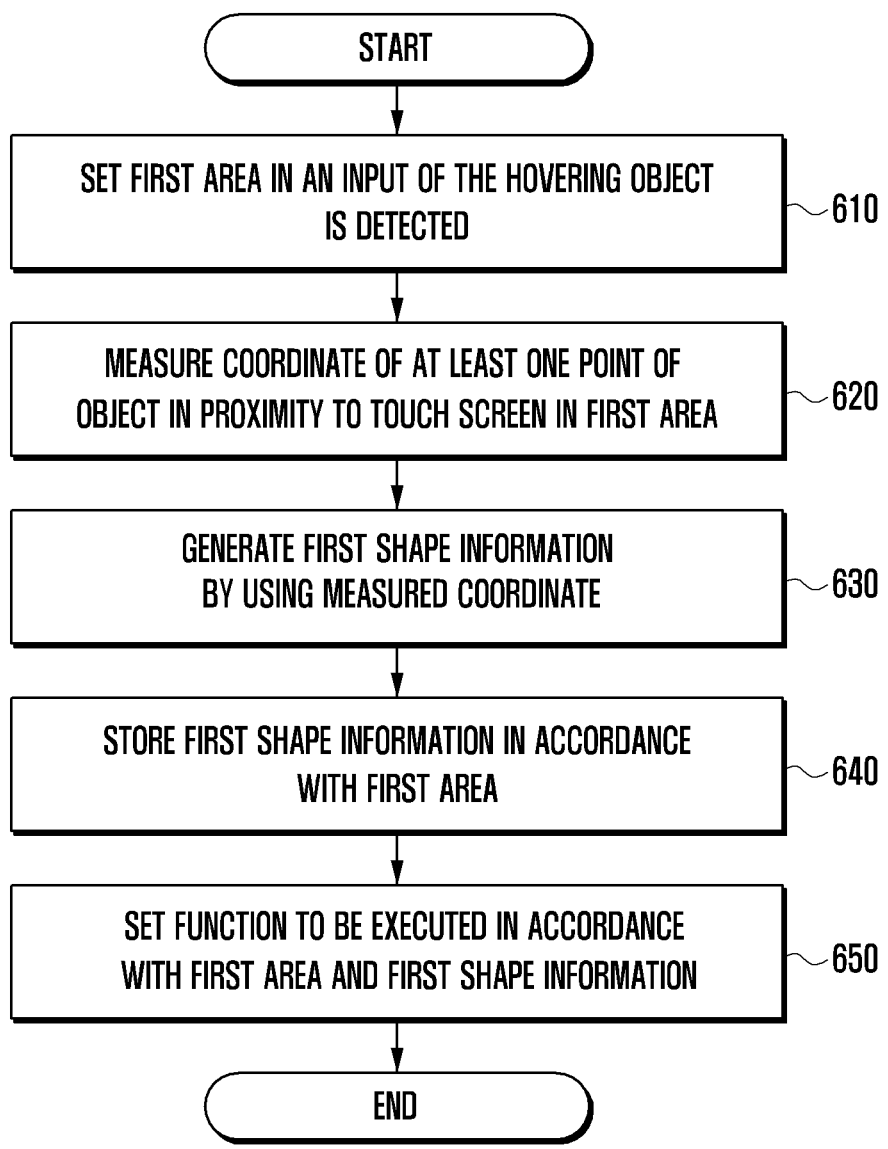
FIG. 6 is a flowchart illustrating a process for acquiring shape information on an object by using the touch screen in a preset area of the electronic device according to one of various embodiments disclosed in this specification.

FIG. 6 is a flowchart illustrating a process for acquiring shape information on an object by using the touch screen in a preset area of the electronic device according to one of various embodiments disclosed in this specification.

The electronic device 100 may set a first area of the touch screen 110 in which an input of the hovering object is detected in step 610.

The electronic device 100 may designate some areas of the touch screen 110 in which a proximity object is detected. Accordingly, the electronic device 100 may detect the object in the first area designated by the user by using the touch screen 110. For example, when the touch screen 110 is divided into four equal parts and the user designates a first quadrant, the input of the hovering object may be received in the first quadrant of the touch screen 110.

The electronic device 100 may measure a coordinate (x, y, z) of at last one point of the object in proximity to the touch screen 110 by detecting hovering in the first area of the touch screen 110 designated in step 610 in step 620.

The electronic device 100 may minutely measure the coordinate (x, y, z) of at least one point of the area included in the object by using the touch screen 110. Further, the electronic device 100 may set a predetermined point of the points included in the area of the object as a reference point. The electronic device 100 may acquire coordinate differences between the reference point and the remaining points by using the reference point. For example, even for the same object, the coordinate thereof may be differently measured according to how proximate the object is to the touch screen 110. Accordingly, when the three-dimensional model of the object is generated by using the coordinate of the reference point and the coordinate difference with the reference point, even though proximity levels of the object are different, the objects may be identified as the same object.

The electronic device 100 may generate first shape information based on the coordinate measured in step 620 (for example, the coordinate of each point or coordinate difference) in step 630.

The shape information may be defined as information generated by collecting heights of the points included in the area of the object and modeling the heights in three dimensions. Accordingly, as a distance between points where the heights are measured is shorter, more detailed and accurate shape information may be generated.

According to an embodiment, the electronic device 100 may generated a three dimensional model of a shape of a finger's curve or a fingerprint by using the touch screen 110. In a case of the fingers, since a thumb, index finger, middle finger, ring finger, and little finger have different shapes and people have different curve levels, different lengths between knuckles, and different wrinkles between knuckles, such information may be used as personal information for security enhancement.

According to an embodiment, the electronic device 100 may generate a model of a shape such as an arch of the palm or lines of the palm in three dimensions by using the touch screen 110. Since the center of the palm arches and each person has unique lines of the hand, the palm may be used as personal information for security enhancement.

According to an embodiment, the electronic device 100 may generate a three-dimensional model of a shape of a skeleton of a back of the hand or wrinkles between knuckles by using the touch screen 110. In a case of the back of the hand, features such as the size of the back of the hand, bone joint distribution, and wrinkles between knuckles may be used as personal information for security enhancement.

The electronic device 100 may store the first shape information generated in step 630 to correspond to the first area in step 640.

The electronic device 100 may use the first area and the first shape information stored in the storage unit 140 for determining similarity with an object in a hovering state later as will be demonstrated in FIG. 7.

The electronic device 100 may set a function to be executed in accordance with the first area and the first shape information in step 650.

The electronic device 100 may preset a function to be executed in accordance with the first area and the first shape information. When newly input shape information on the object matches the first shape information and the input is made in the first area, the electronic device 100 may execute the preset function.

For example, when the electronic device 100 detects shape information on a thumb in the first quadrant of the touch screen 110, the electronic device 100 may execute an unlock function. Further, when the electronic device 100 detects shape information on an index finger in the second quadrant of the touch screen 110, the electronic device 100 may execute a call function.

Figure 7:
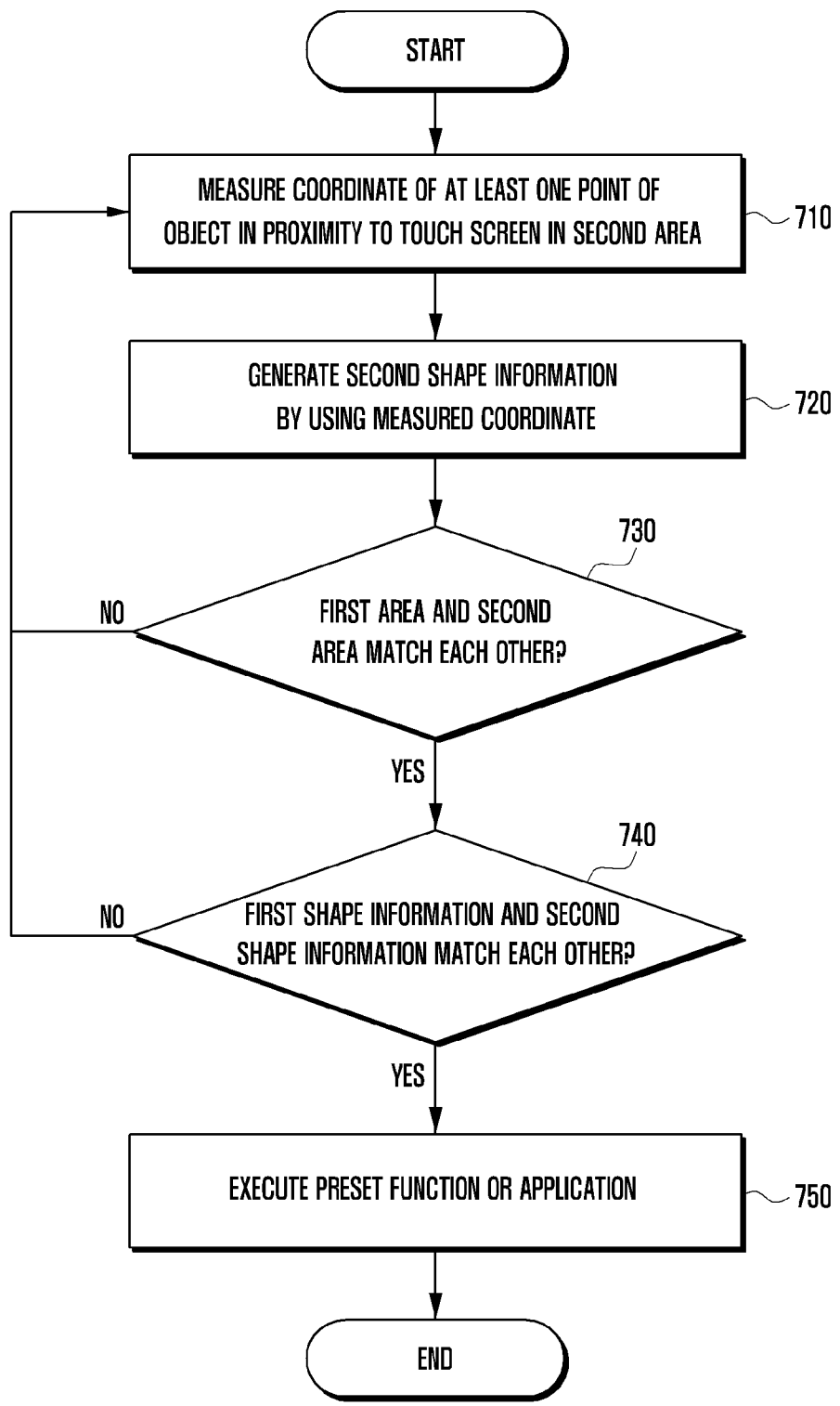
FIG. 7 is a flowchart illustrating a process for determining whether an area in which an object is detected using the touch screen of the electronic device and shape information on the object match each other, and, when the area and the shape information match each other, executing a preset function according to one of various embodiments disclosed in this specification.

FIG. 7 is a flowchart illustrating a process for determining whether an area in which the object is detected using the touch screen of the electronic device and shape information on the object match each other, and, when the area and the shape information match each other, executing a preset function according to one of various embodiments disclosed in this specification.

The electronic device 100 may measure a coordinate (x, y, z) of at least one point of the object in proximity to the touch screen 110 in the second area of the touch screen 110 by detecting, through the touch screen 110, hovering, in an operation 710.

The electronic device 100 may minutely measure the coordinate (x, y, z) of at least one point of the area included in the object by using the touch screen 110. Further, the electronic device 100 may set a predetermined point of the points included in the area of the object as a reference point. The electronic device 100 may acquire coordinate differences between the reference point and the remaining points by using the reference point. For example, even for the same object, the coordinate thereof may be differently measured according to how proximate the object is to the touch screen 110. Accordingly, when a three-dimensional model of the object is generated by using the coordinate of the reference point and the coordinate difference with the reference point, even though proximity levels of the object are different, the objects may be identified as the same object.

The electronic device 100 may generate second shape information based on the coordinate measured in step 710 (for example, the coordinate of each point or coordinate difference) in step 720.

The shape information may be defined as information generated by collecting coordinates of points included in the area of the object and modeling the coordinates in three dimensions. Accordingly, as a distance between points where the coordinates are measured is shorter, more detailed and accurate shape information may be generated.

According to an embodiment, the electronic device 100 may model a shape of a finger's curve or a fingerprint by using the touch screen 110. In a case of the fingers, since a thumb, index finger, middle finger, ring finger, and little finger have different shapes and people have different curve levels, different lengths between knuckles, and different wrinkles between knuckles, such information may be used as personal information for security enhancement.

According to an embodiment, the electronic device 100 may generated a model of a shape such as an arch of the palm or lines of the palm in three dimensions by using the touch screen 110. Since the center of the palm arches and each person has unique lines of the hand, the palm may be used as personal information for security enhancement.

According to an embodiment, the electronic device 100 may generated a three-dimensional model of a shape of a skeleton of a back of the hand or wrinkles between knuckles by using the touch screen 110. In a case of the back of the hand, features such as the size of the back of the hand, bone joint distribution, and wrinkles between knuckles may be used as personal information for security enhancement.

The electronic device 100 may determine whether the first area designated in step 610 and the second area designated in step 710 match each other in step 730.

When the first area and the second area do not match each other, the electronic device 100 may detect the object in the hovering state again in the second area of the touch screen 110 in step 710.

When the first area and the second area match each other, the electronic device 100 may compare the second shape information generated in step 720 and pre-stored first shape information and determine whether the first shape information and the second shape information match each other in step 740.

The electronic device 100 may compare the first shape information stored in the storage unit 140 with the second shape information and determine similarity. The electronic device 100 may freely rotate or move the three-dimensionally modeled shape information to determine similarity therebetween. Accordingly, it is possible to determine whether the pieces of shape information match each other regardless of an angle at or a location on which the object approaches.

When it is determined that the first shape information and the second shape information match each other, the electronic device 100 may execute the preset function corresponding to the first area and the first shape information preset in step 750.

For example, when the electronic device 100 detects shape information on a thumb in the first quadrant of the touch screen 110, the electronic device 100 may execute an unlock function. When the electronic device 100 detects the thumb in the second quadrant rather than the first quadrant, the electronic device 100 cannot execute the unlock function corresponding to the first shape information.

When it is determined that the first shape information and the second shape information do not match each other, the electronic device 100 may detect the object in the hovering state again in the second area of the touch screen 110 in step 710.

According to an embodiment, the electronic device 100 may generate at least one of a message, a sound, and a vibration having a meaning to make the object be in proximity to the touch screen again since the pieces of shape information do not match each other.

Figure 8:
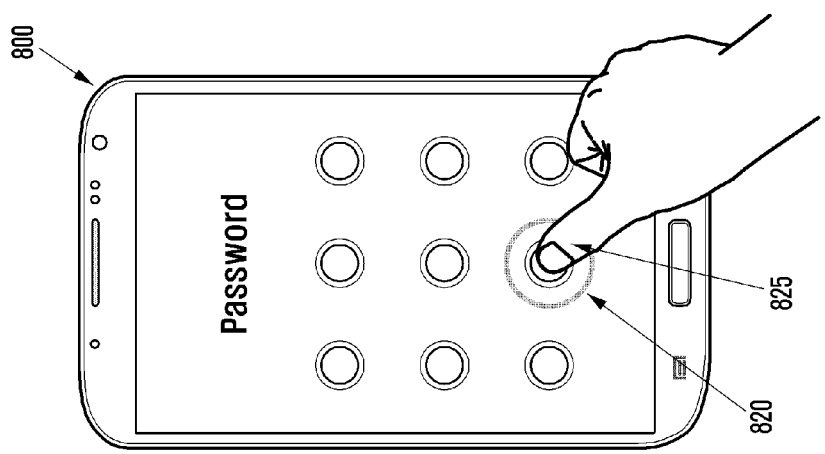
FIG. 8 illustrates a method of identifying a preset area and pre-generated shape information by using the touch screen of the electronic device and executing a function according to one of various embodiments disclosed in this specification.
Figure 8:
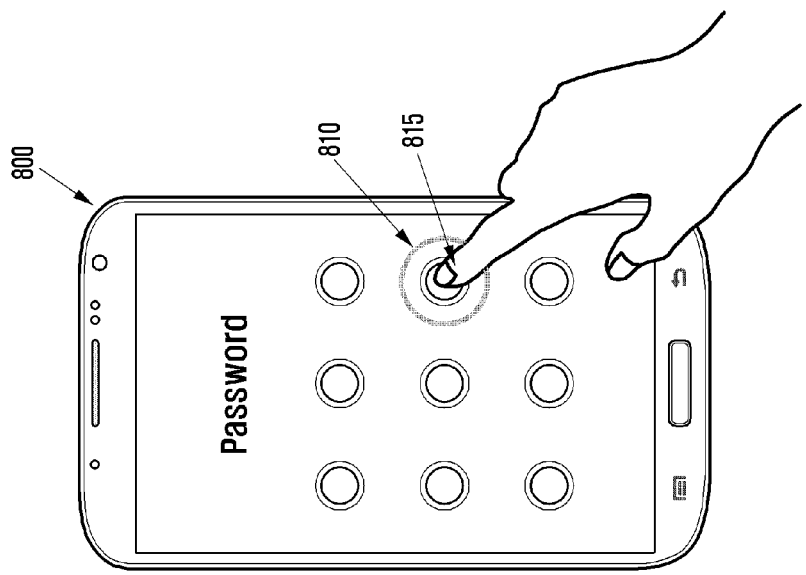

FIG. 8 illustrates a method of identifying a preset area and pre-generated shape information by using the touch screen of the electronic device and executing a function according to one of various embodiments disclosed in this specification.

The electronic device 800 or 100 may generate shape information on an object in proximity to the touch screen 110. The touch screen 110 of the electronic device 800 may include the touch panel 111 and the display unit 112.

According to the present disclosure, when the touch panel 111 is configured in the capacitive type, the touch screen 110 receive an input by an object such as a finger which may generate a capacitance change. Particularly, the touch panel 111 may detect the capacitance change according to a difference in the height of the object and may measure the height of a point of at least a part of the object by using the capacitance change. When the object, which may generate the capacitance change, hovers on the touch screen 110, the touch screen 110 may receive an input corresponding to hovering. The input corresponding to the hovering may include at least one coordinate (x, y, z). Specifically, a touch Integrated Circuit (IC) of the touch panel 111 may detect the hovering object, determine a hovering area in the touch screen 110, and transfer a coordinate (x, y) included in the hovering area to the controller 160. The coordinate (x, y) included in the hovering area may be a pixel unit. In addition, the touch screen 110 may detect a height (z) corresponding to a point (x, y) of at least a part of the hovering object and transfer the coordinate (z) of the height to the controller 160. Meanwhile, a coordinate (x, y, z) of at least one detected point of the hovering object may be used for generating shape information on the object.

According to an embodiment, the touch screen 110 of the electronic device 800 may have 3×3 arrangements, (x, y), where x is a row number, and y is a column number. The user of the electronic device 800 may make an index finger 815 approach an area 810 (2, 3). When an alarm function is set to the area 810 (2, 3) of the electronic device 800 and the index finger 815, the electronic device 800 may execute the alarm function. When no function is set to the 2×3 area 810 of the electronic device 800 and the index finger 815, the electronic device 800 may generate the message, the sound, or the vibration to make the object approach the touch screen again.

According to an embodiment, the touch screen 110 of the electronic device 800 may have 3×3 arrangements. The user of the electronic device 800 may make a thumb 825 approach an area 820 (3, 2). When a Social Network Service (SNS) (for example, Facebook) application is set in the area 820 (3, 2) of the electronic device 800 and the thumb 825, the electronic device 800 may execute the Facebook application. When no function is set to the area 820 (3, 2) of the electronic device 800 and the thumb 825, the electronic device 800 may generate the message, the sound, or the vibration to make the object approach the touch screen again.

A method of performing a function of an electronic device according to various embodiments may include: detecting a hovering of a first object in proximity to the electronic device; measuring a first coordinate of at least one location included in the surface of the first object based on the hovering; generating first shape information on the first object based on the first coordinate; and setting a function to be executed in accordance with the first shape information.

The method may further include: detecting a hovering of a second object in proximity to the electronic device; measuring a second coordinate of at least one location included in the surface of the second object based on the hovering; and generating second shape information on the second object based on the second coordinate.

The method may further include: determining whether the first shape information and the second shape information match each other; and performing the set function in accordance with the first shape information when the first shape information and the second shape information match each other.

The first coordinate may be measured through a first area of the electronic device, the second coordinate may be measured through a second area of the electronic device, and the function may be set in accordance with the first area and the first shape information.

The method may further include: determining whether the first area and the second area match each other; and determining whether the first shape information and the second shape information match each other.

When the first area and the second area match each other and the first shape information and the second shape information match each other, the method may further include performing the set function in accordance with the first area and the first shape information.

The set function may correspond to an unlock function.

When the first shape information and the second shape information do not match each other, the method may further include outputting a control to output at least one of a message, a sound, and a vibration.

According to various embodiments, at least some of the devices (for example, modules or functions thereof) or the method (for example, operations) according to the present disclosure may be implemented by a command stored in a computer-readable storage medium in a programming module form. When the command is executed by one or more processors (for example, the controller 160), the one or more processors may execute a function corresponding to the command. The computer-readable storage medium may be, for example, the storage unit 140. At least some of the programming modules may be implemented (for example, executed) by, for example, the controller 160. At least some of the programming modules may include, for example, a module, a program, a routine, a set of instructions or a process for performing one or more functions.

The computer readable recording medium may include magnetic media such as a hard disc, a floppy disc, and a magnetic tape, optical media such as a compact disc read only memory (CD-ROM) and a digital versatile disc (DVD), magneto-optical media such as a floptical disk, and hardware devices specifically configured to store and execute program commands or executable instructions, such as a read only memory (ROM), a random access memory (RAM), and a flash memory. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, or a combination hardware configured with machine executable code and may be performed in whole or in part within the programmed instructions of a computer. No claim element herein is to be construed under the provisions of 35 U.S.C. 112, sixth paragraph, unless the element is expressly recited using the phrase "means for".

The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. §101 and does not constitute software per se.

In addition, an artisan understands and appreciates that a "processor" or "microprocessor" constitute hardware in the claimed disclosure. Under the broadest reasonable interpretation, the appended claims constitute statutory subject matter in compliance with 35 U.S.C. §101.

The functions and process steps herein may be performed automatically or wholly or partially in response to user command. An activity (including a step) performed automatically is performed in response to executable instruction or device operation without user direct initiation of the activity.

The programming module according to the present disclosure may include one or more of the aforementioned components or may further include other additional components, or some of the aforementioned components may be omitted stored in a non-transitory computer-readable medium. Operations executed in a module, a programming module, or other component elements according to various embodiments of the present disclosure may be executed sequentially, in parallel, repeatedly, or in a heuristic manner by one or more processors. Further, some operations may be executed according to another order or may be omitted, or other operations may be added.

According to various embodiments, a non-transitory computer-readable medium storing a computer program including commands for performing a process in an electronic device is provided. The process may include: detecting a hovering of a first object in proximity to the electronic device; measuring a first coordinate of at least one location included in the surface of the first object based on the hovering; generating first shape information on the first object based on the first coordinate; and setting a function to be executed in accordance with the first shape information.

The process may further include: detecting a hovering of a second object in proximity to the electronic device; measuring a second coordinate of at least one location included in the surface of the second object based on the hovering; and generating second shape information on the second object based on the second coordinate.

The process may further include: determining whether the first shape information and the second shape information match each other; and performing the set function in accordance with the first shape information when the first shape information and the second shape information match each other.

The embodiments disclosed in the specification and drawings are merely presented to easily describe technical contents of various embodiments of the present disclosure and help the understanding of them and are not intended to limit the scope of various embodiments of the present disclosure. Therefore, all changes or modifications derived from the technical idea of various embodiments of the present disclosure as well as various embodiments disclosed herein should be construed to fall within the scope of various embodiments of the present disclosure.

What is claimed is:

1. A method of performing a function of an electronic device, the method comprising:
   detecting a first hovering object in proximity to the electronic device;
   measuring, while the first hovering object is hovering and stationary over the electronic device, a first coordinate of at least one point included on a surface of the first hovering object based on detection of the first hovering object;
   generating first shape information of the first hovering object based on the first coordinate; and
   setting a function to be executed in accordance with the first shape information,
   wherein the first shape information includes at least one of a fingerprint and a curved surface of the first hovering object.

2. The method of claim 1, further comprising:
   detecting a second hovering object in proximity to the electronic device;
   measuring a second coordinate of at least one point included in the surface of the second hovering object based on detecting the second hovering object; and
   generating second shape information on the second hovering object based on the second coordinate.

3. The method of claim 2, further comprising:
   determining whether the first shape information and the second shape information match each other; and
   performing the set function in accordance with the first shape information when the first shape information and the second shape information match each other.

4. The method of claim 2, wherein the first coordinate is measured through a first area of the electronic device, the second coordinate is measured through a second area of the electronic device, and the function is set in accordance with the first area and the first shape information.

5. The method of claim 4, further comprising:
   determining whether the first area and the second area match each other; and
   determining whether the first shape information and the second shape information match each other.

6. The method of claim 5, further comprising, when the first area and the second area match each other and the first shape information and the second shape information match each other, performing the set function in accordance with the first area and the first shape information.

7. The method of claim 1, wherein the set function corresponds to an unlock function.

8. The method of claim 3, further comprising, when the first shape information and the second shape information do not match each other, outputting at least one of a message, a sound, and a vibration.

9. An electronic device comprising:
   a touch screen for detecting a first hovering predetermined object in proximity to the electronic device;
   a storage unit for storing shape information on the first hovering predetermined object and a setting of a function to be executed in accordance with the shape information; and
   a controller for measuring, while the first hovering predetermined object is hovering and stationary over the electronic device, a first coordinate of at least one point on a surface of a first hovering predetermined object based on detection of the first hovering predetermined object, generating first shape information of the first hovering predetermined object based on the first coordinate, and setting a function to be executed in accordance with the first shape information,
wherein the first shape information includes at least one of a fingerprint and a curved surface of the first hovering object.

10. The electronic device of claim 9, wherein the controller measures a second coordinate of at least one point included on the surface of a second hovering object and generates second shape information on the second hovering object based on the second coordinate.

11. The electronic device of claim 10, wherein the controller determines whether the first shape information and the second shape information match each other and, when the first shape information and the second shape information match each other, performs the set function in accordance with the first shape information.

12. The electronic device of claim 10, wherein the controller measures the first coordinate through a first area of the electronic device and the second coordinate through a second area of the electronic device, and sets the function to be executed in accordance with the first area and the first shape information.

13. The electronic device of claim 12, wherein the controller determines whether the first area and the second area match each other and determines whether the first shape information and the second shape information match each other.

14. The electronic device of claim 13, wherein, when the first area and the second area match each other and the first shape information and the second shape information match each other, the controller performs the set function in accordance with the first area and the first shape information.

15. The electronic device of claim 9, wherein the set function corresponds to an unlock function.

16. The electronic device of claim 11, wherein, when the first shape information and the second shape information do not match each other, the controller makes a control to output at least one of a message, a sound, and a vibration.

17. The electronic device of claim 9, wherein the touch screen is a capacitive type touch screen.

18. A non-transitory computer-readable medium storing a plurality of instructions, the plurality of instructions comprising commands for performing a process in an electronic device, the process comprising:
detecting a first hovering object in proximity to the electronic device;
measuring, while the first hovering object is hovering and stationary over the electronic device, a first coordinate of at least one point on a surface of the first hovering object based on detection of the first hovering object;
generating first shape information of the first hovering object based on the first coordinate; and
setting a function to be executed in accordance with the first shape information,
wherein the first shape information includes at least one of a fingerprint and a curved surface of the first hovering object.

19. The non-transitory computer-readable medium of claim 18, the commands further comprising:
detecting a second hovering object in proximity to the electronic device;
measuring a second coordinate of at least one point included on the surface of the second hovering object based on detection of the second hovering object; and
generating second shape information on the second hovering object based on the second coordinate.

20. The non-transitory computer-readable medium of claim 19, the commands further comprising:
determining whether the first shape information and the second shape information match each other; and
performing the set function in accordance with the first shape information when the first shape information and the second shape information match each other.

* * * * *